J. E. FINLEY.
Churn-Dasher.

No. 223,642.      Patented Jan. 20, 1880.

Witnesses;
Alexander Scott
T. Walter Fowler

Inventor;
John E. Finley

United States Patent Office.

JOHN E. FINLEY, OF MEMPHIS, TENNESSEE.

CHURN-DASHER.

SPECIFICATION forming part of Letters Patent No. 223,642, dated January 20, 1880.

Application filed July 26, 1879.

*To all whom it may concern:*

Be it known that I, JOHN E. FINLEY, of Memphis, in the county of Shelby and State of Tennessee, have invented a new and useful Improvement in Churn-Dashers, of which the following is a specification.

The invention relates to rotary dashers used in the ordinary upright churn-tubs.

The object of my invention is to provide churns which are made in the ordinary upright form with a dasher that will revolve by force of the fluid when the staff is raised and lowered, which is done in the process of churning, and with a lid so constructed that the air which is carried into the churn by the agitation of the cream can escape through holes made for that purpose.

The invention consists in placing upon a staff a wheel cut from one piece of metal with flanges or wings turned upward, and a rim or guard encircling the same, for the purpose of strengthening the dasher or wheel, while the angle at which the wings are set causes the dasher to revolve when the staff is operated, and the upturned wings or flanges with the rim act as a gatherer for the butter after the process of churning.

Figure 1:
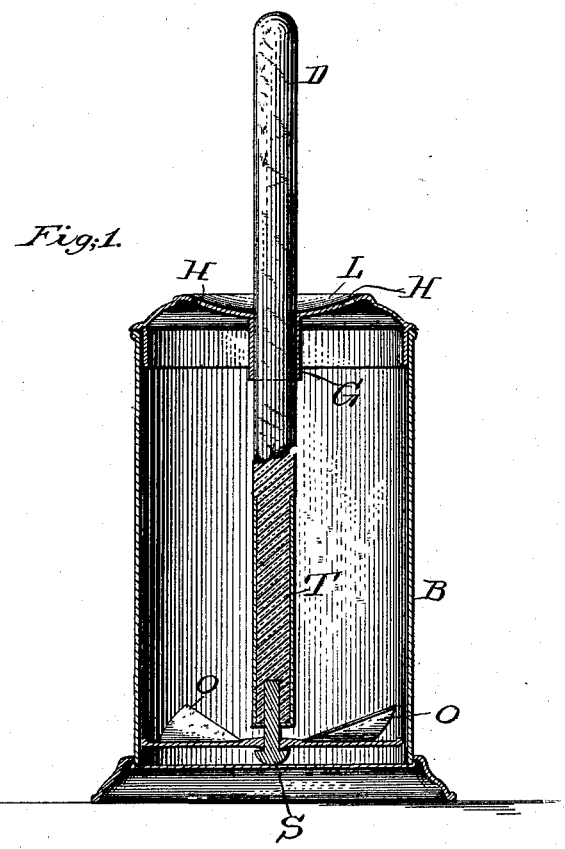
Figure 2:
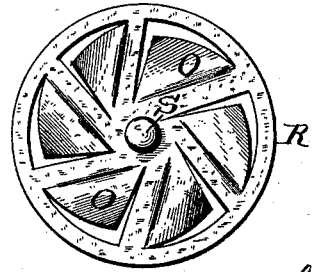

In the accompanying drawings, in which similar letters indicate like parts, Figure 1 is a sectional view, showing a part of the churn removed. Fig. 2 is a view of the dasher detached.

B is the body of the churn; O O, flanges of the wheel or dasher; R, rim; T, thimble; D, staff; L, lid; H, holes in the lid, and G guide for the staff; S, screw in the end of the staff upon which the dasher or wheel revolves.

The body of the churn B is constructed in the upright form, to which is attached the lid L, with holes made in the concave part of the lid, as shown at H, which allow the air to escape while the churning is being done, instead of by the opening through which the staff passes, as in the ordinary dash-churn. The lid has a guide, as shown at G, to keep the dash from striking the sides of the churn.

I use a dasher made from one sheet of metal with upturned blades or flanges O O, constructed in such a manner that the fluid passing through the dasher when the same is being operated will cause the same to revolve upon the screw S, which is placed in the end of the thimble T upon the staff D, when the staff D is operated, while the rim R, with the wings or upturned flanges O O, are used in the gathering and removal of the butter.

Having described my invention, what I claim, and wish to secure by Letters Patent, is—

The dasher made from a single sheet of metal having upturned wings or flanges O O and an outer rim, R, and fastened upon a staff, D, by means of the screw S and thimble T, for the purposes set forth.

JOHN E. FINLEY.

Witnesses:
  D. P. COWL,
  J. C. WILDMAN.